United States Patent
Gentry

(10) Patent No.: US 7,615,148 B1
(45) Date of Patent: Nov. 10, 2009

(54) SEAWALL FILTER

(76) Inventor: David W. Gentry, 13278 N. 320th St., Casey, IL (US) 62420

( * ) Notice: Subject to any disclaimer, the term of this patent is extended or adjusted under 35 U.S.C. 154(b) by 18 days.

(21) Appl. No.: 12/148,400

(22) Filed: Apr. 18, 2008

Related U.S. Application Data

(60) Provisional application No. 60/925,003, filed on Apr. 18, 2007.

(51) Int. Cl.
*B01D 35/02* (2006.01)
*E02B 3/04* (2006.01)

(52) U.S. Cl. .............. 210/170.07; 210/448; 210/454; 210/461; 210/463; 210/484; 210/497.3; 405/31; 405/43; 405/284

(58) Field of Classification Search ............. 210/162, 210/163, 164, 170.01, 170.07, 170.09, 170.11, 210/448, 449, 454, 460, 461, 463, 484, 485, 210/497.3
See application file for complete search history.

(56) References Cited

U.S. PATENT DOCUMENTS

| | | | | |
|---|---|---|---|---|
| 2,647,636 A * | 8/1953 | Rafferty | ...................... | 210/448 |
| 3,456,799 A * | 7/1969 | Musial | ....................... | 210/448 |
| 3,498,464 A * | 3/1970 | Enosolone | ................... | 210/461 |
| 4,211,543 A * | 7/1980 | Tokar et al. | .................. | 210/484 |
| 4,460,462 A * | 7/1984 | Arneson | ...................... | 210/163 |
| 4,645,600 A * | 2/1987 | Filippi | ......................... | 210/484 |
| 4,666,334 A * | 5/1987 | Karaus | ......................... | 405/31 |
| 5,015,375 A * | 5/1991 | Fleck | .......................... | 210/484 |
| 5,916,435 A * | 6/1999 | Spearman et al. | ......... | 210/497.3 |
| 6,394,706 B1 | 5/2002 | Gentry | ......................... | 405/284 |
| 2007/0181486 A1* | 8/2007 | Ashliman | .................... | 210/485 |
| 2007/0193129 A1* | 8/2007 | Mansfield | .................... | 52/79.9 |
| 2008/0169228 A1* | 7/2008 | Ventura | ....................... | 210/164 |

* cited by examiner

Primary Examiner—Christopher Upton
(74) Attorney, Agent, or Firm—Philip L. Bateman

(57) ABSTRACT

A filter assembly for a seawall filters the flow of groundwater through a hole in the wall. The filter assembly includes: (a) a housing containing a flat flange and a perforated conical shell, the shell adapted to extend into the hole with its apex extending toward the landward side, the flange having a seaward side adapted to fit flushly against the seawall, the flange having a landward side connected to the shell, the flange having an opening that defines an open base for the shell; (b) a perforated conical cage having an open base that fits within the shell of the housing; (c) a conical filter element having an open base that fits within the cage; (d) a perforated conical sleeve having an open base that fits within the filter element; and (e) a perforated cap that is removably and flushly fastened to the opening in the flange to secure the cage, filter element, and sleeve within the shell of the housing.

10 Claims, 6 Drawing Sheets

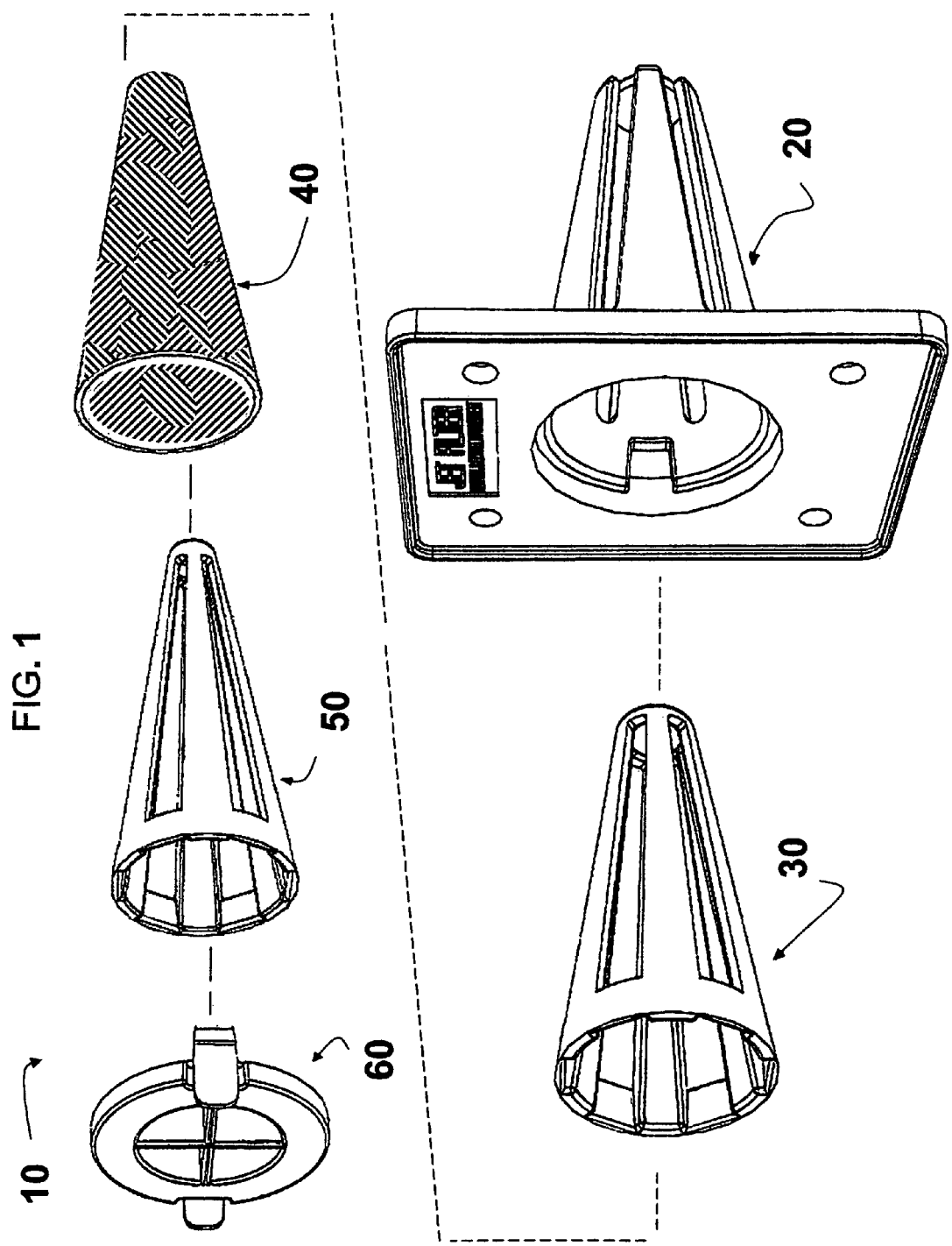

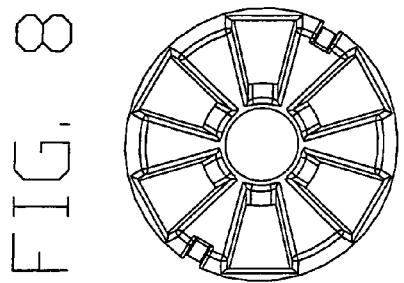
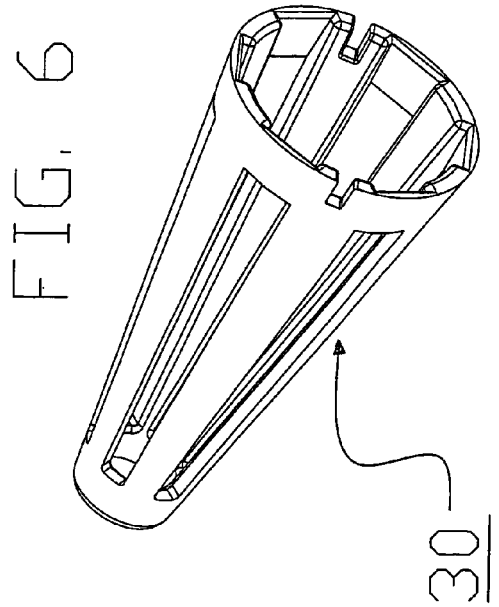
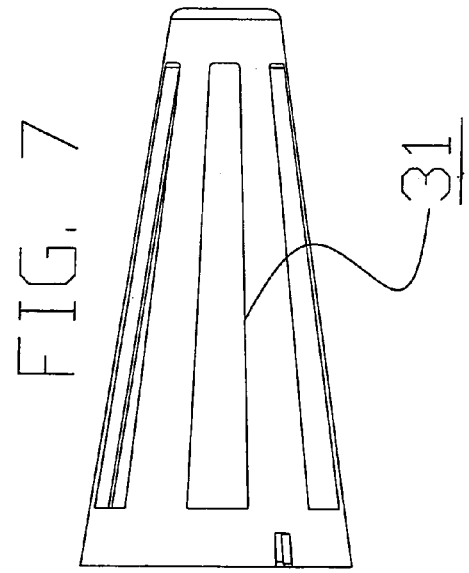

50

51

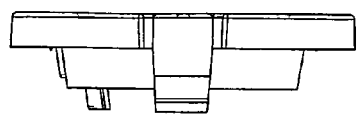
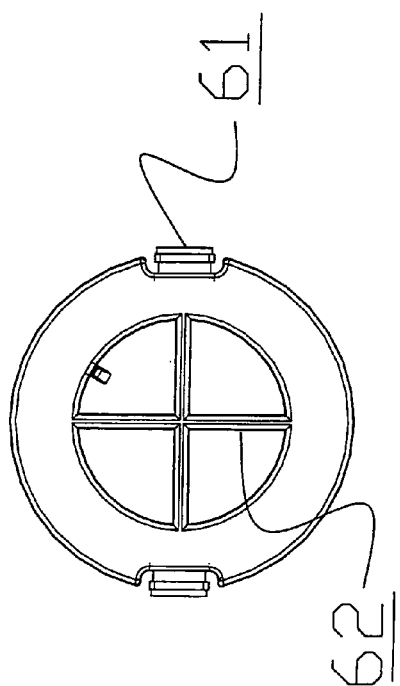
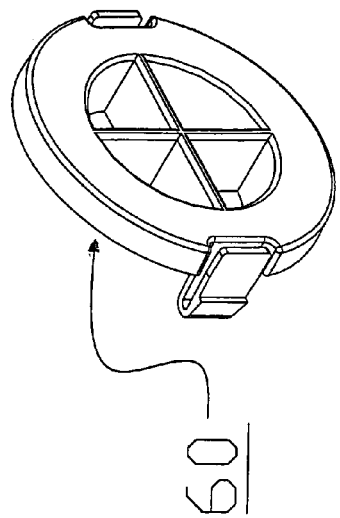
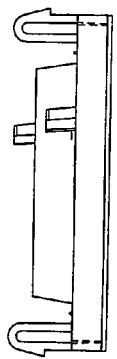

_US 7,615,148 B1_

SEAWALL FILTER

CROSS-REFERENCE TO RELATED APPLICATION

This application claims the benefit of U.S. Provisional Application Ser. No. 60/925,003, Apr. 18, 2007.

FIELD OF THE INVENTION

This invention relates to hydraulic and earth engineering. More particularly, this invention relates to seawalls.

BACKGROUND OF THE INVENTION

Seawalls are commonly built along shorelines to protect the adjoining ground from erosion and to provide an aesthetic appearance to the shoreline. Seawalls typically extend downwardly into the solid bottom of the waterway and extend upwardly a short distance above ground level. Seawalls are made of various materials including poured concrete, masonry blocks, steel or plastic panels, and the like. The term "seawall" is used herein to include retaining walls, bulkheads, sheet pilings and other erosion control barriers between land and water.

When it rains or when waves overlap the seawall, water enters the ground behind the seawall and causes it to expand. The expansion of the ground creates hydraulic pressure that exerts a considerable outward force on the seawall. Without a mechanism for relieving the hydraulic pressure, the seawall can be damaged.

A common mechanism for relieving hydraulic pressure is to include drain holes (sometimes known as weep holes) at spaced intervals along the seawall. The holes are located above the water level and below the ground level. The holes provide a path for water in the ground to pass through the seawall and empty into the waterway. A simple hole in the seawall provides some drainage for water, but also allows excessive amounts of soil to escape. To allow water to escape but to retain soil, seawall drain holes preferably contain a filter. The term "filter" is used herein to refer to a filter assembly or to the replaceable filter element itself, as the context requires. When the meaning may not be clear, the terms "filter assembly" or "filter element" are used.

As with all filters, seawall drain filters must be cleaned periodically. When the filter is placed underground on the inner (landward) side of the seawall, digging is required to gain access to the filter.

Gentry, U.S. Pat. No. 6,394,706, May 28, 2002, discloses a seawall filter assembly with a filter element that is changed from the outer (seaward) side of the wall, thus eliminating the need to dig into the ground. The seawall filter assembly contains a conduit that is driven into a hole in the seawall. The inner (landward) end of the conduit contains a disc filter element. The outer (seaward) end of the conduit extends outwardly from the seawall. This seawall filter assembly suffers from several disadvantages. First, it is difficult to drive the conduit into the hole. Second, a special tool is needed to install and service the filter element. Third, the filter element has a surface area of filtration equal only to the cross-sectional area of the inside of the conduit. As a result, the filter element must be replaced frequently. And fourth, the conduit extending outwardly from the seawall can damage boats that dock along the seawall and is, itself, prone to damage.

Accordingly, there is a demand for an improved seawall filter. More particularly, there is a demand for a seawall filter that is easier to install, easier to service, has a much greater surface area of filtration, and is flush with the outer surface of the seawall.

SUMMARY OF THE INVENTION

The general object of this invention is to provide an improved seawall filter assembly. More particular objects are to provide a seawall filter assembly that is easier to install, easier to service, has a much greater surface area of filtration, and is flush with the outer surface of the seawall.

I have invented an improved seawall filter assembly for a seawall having a seaward side, a landward side, and a hole communicating between the sides for allowing groundwater to flow from the landward side to the seaward side. The seawall filter assembly comprises: (a) a housing comprising a flat flange and a perforated conical shell, the shell having a base and an apex, the shell adapted to extend into the hole with its apex extending toward the landward side, the flange having a seaward side adapted to fit flushly against the seawall, the flange having a landward side connected to the shell, the flange having an opening that defines an open base for the shell; (b) a perforated conical cage having an open base that fits within the shell of the housing; (c) a conical filter element having an open base that fits within the cage; (d) a perforated conical sleeve having an open base that fits within the filter element; and (e) a perforated cap that is removably and flushly fastened to the opening in the flange to secure the cage, filter element, and sleeve within the shell of the housing.

The seawall filter assembly of this invention is easy to install because the hole in the seawall is sealed by the flange of the housing so that the shell of the housing need not fit tightly into the hole. The seawall filter assembly is easy to service because no tools are required to gain access to the filter element from the seaward side of the seawall. The seawall filter has a much greater surface area of filtration because its filter element is a cone rather than a disc. The flange of the housing and the cap fit flushly against the outer surface of the seawall so they will not damage boats and so that they are less likely to be damaged themselves.

BRIEF DESCRIPTION OF THE DRAWINGS

FIG. 1 is an exploded perspective view of a preferred embodiment of the seawall filter assembly of this invention.
FIG. 6 is a perspective view of the cage of the assembly.
FIG. 7 is a side elevation view thereof.
FIG. 8 is a front elevation view thereof.
FIG. 12 is a perspective view of the cap of the assembly.
FIG. 13 is a front elevation view thereof.
FIG. 14 is a side elevation view thereof.
FIG. 15 is a top plan view thereof.

DETAILED DESCRIPTION OF THE INVENTION

Figure 4:
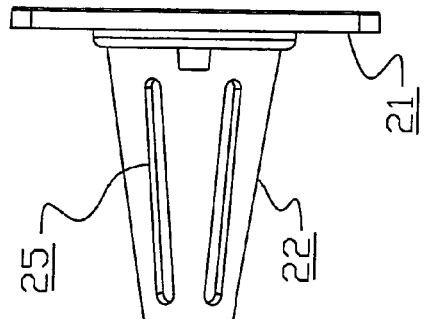
FIG. 4 is a side elevation view thereof.
Figure 2:
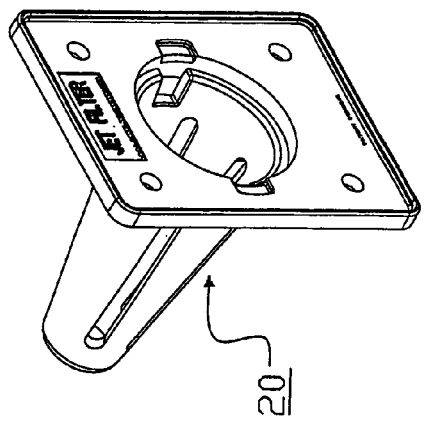
FIG. 2 is a perspective view of the housing of the assembly.
Figure 3:
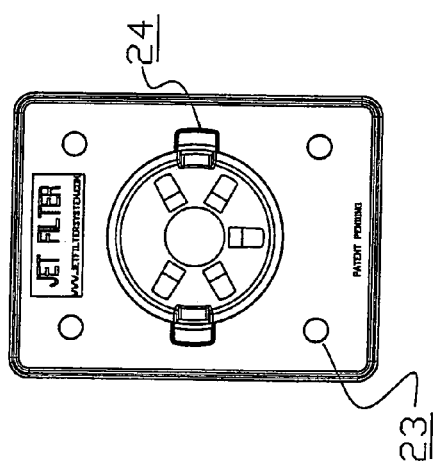
FIG. 3 is a front elevation view thereof.
Figure 5:
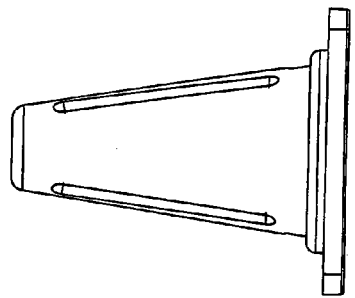
FIG. 5 is a top plan view thereof.

This invention is best understood by reference to the drawings. Referring first to FIG. 1, the seawall filter assembly 10 of this invention comprises a housing 20, a cage 30, a filter element 40, a sleeve 50, and a cap 60. The housing, cage, filter element, and sleeve are nested, i.e., each one fits within the immediately larger component. They are also conical in shape, i.e., they have a circular cross-section and taper inwardly from a base toward an apex. The shape of the components are described herein using standard geometry terms that are used to describe right circular cones. Each of the components of the seawall filter assembly is discussed in more detail below.

A preferred embodiment of the housing 20 is illustrated in FIGS. 2 to 5. The housing is adapted to be permanently attached at and into a hole in the seawall. The other components of the assembly fit into the housing. The housing contains a flange 21 and a conical shell 22. The shell is connected to the landward (inner) side of the flange. The flange is generally flat so that its seaward (outer) side forms a relatively flush surface against the seaward side of the seawall. In the preferred embodiment, the flange contains a small lip along its perimeter to provide additional rigidity and strength. The flange contains holes 23 in each of its four corners for attaching the housing to the seawall with suitable fasteners (not shown). The preferred type of fastener depends on the structure of the seawall.

The conical shell of the housing has an open base which is defined by a central opening in the flange. Recesses 24 on opposite sides of the opening engage the cap. The conical shell extends into the hole with its apex (tip) extending toward the landward side. The conical shape is preferred because it best penetrates the ground during installation. In the preferred embodiment, the cone is truncated near the apex to form a frustum. The truncation provides more strength than a sharp point. Other elongated shapes, such as pyramidal, cylindrical, etc. are suitable, but less preferred. The shell contains perforations 25 to allow water to pass through it (from outside to inside). In the preferred embodiment, the perforations consist of five longitudinal slits.

The size of the housing is a matter of choice depending on the size of the hole which is, in turn, dependent on the seawall, the number of holes in the seawall, the ground conditions, the climate, etc. In the case of a hole having a diameter of about two and one-half inches, the flange is generally about three to five inches in height and width. The shell is generally about three to six inches in length with a diameter that tapers from slightly less than two and one-half inches to about one inch. The housing is made of a durable, weatherproof material. Preferred materials are thermoplastics such as acrylonitrile butadiene styrene (ABS), polyethylene, polypropylene, polyvinylchloride (PVC), and the like. The most preferred material is ultraviolet (UV) protected ABS.

A preferred embodiment of the cage 30 is illustrated in FIGS. 6 to 8. The cage provides the outer support for the filter element. The cage is conical in shape, preferably truncated near it apex to form a frustum and to conform closely to the shape of the shell of the housing. The cage contains perforations 31 to allow water to pass through it (from outside to inside). In the preferred embodiment, the perforations consist of six longitudinal slits. The cage is preferably made of the same types of materials used to make the housing.

The filter element 40 restrains the soil but allows water to pass through it. The filter is conical in shape and is held in position between the cage and the sleeve. The filter is made of a durable, waterproof, porous material. It is preferably made of a woven polyolefin. An especially preferred material is MIRAFI FILTERWEAVE 300, a woven polypropylene which is a commercial product of TenCate Geosynthetics North America of Pendergrass, Ga. In the preferred embodiment, the filter has a maximum diameter of about two and one-half inches and a slant height of about three and one-half inches. It has a surface area of over fourteen square inches, which is about triple the cross-sectional area of the hole. The relatively large surface area greatly reduces the rate at which the filter becomes clogged and, accordingly, greatly reduces the frequency with which the filter needs to be serviced and/or replaced.

Figure 11:
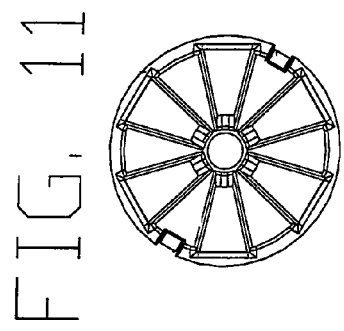
FIG. 11 is a front elevation view thereof.
Figure 9:
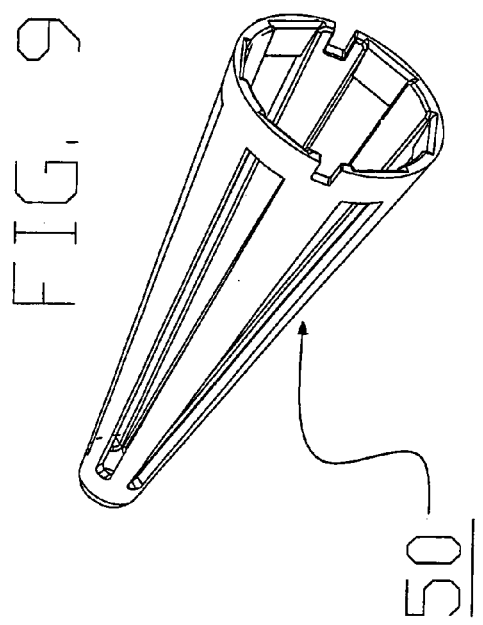
FIG. 9 is a perspective view of the sleeve of the assembly.
Figure 10:
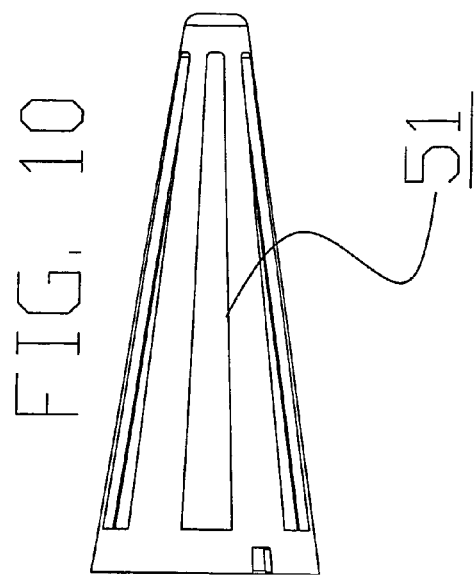
FIG. 10 is a side elevation view thereof.

A preferred embodiment of the sleeve 50 is illustrated in FIGS. 9 to 11. The sleeve provides the inner support for the filter element. The sleeve is conical in shape, preferably truncated near its apex. The sleeve contains perforations 51 to allow water to pass through it (from outside to inside). In the preferred embodiment, the perforations consist of six longitudinal slits. The sleeve is made preferably made of the same types of materials used to make the housing.

A preferred embodiment of the cap 60 is illustrated in FIGS. 12 to 15. The cap secures the cage, filter element, and sleeve within the housing. The cap is circular in shape with two resilient spring clips 61 on opposite sides that engage the corresponding recesses in the opening of the housing flange. It can be appreciated that the cap locks into position by simply pressing the cap into the opening and that the cap is removed by pushing the clips inwardly. A variety of other mechanisms known in the art for securing caps are also suitable. The cap contains perforations to allow water to pass through it. In the preferred embodiment, the cap contains a circular opening that is bisected by two ribs 62 that provide rigidity and strength. The cap is made preferably made of the same types of materials used to make the housing.

Although the cage, filter element, sleeve, and cap are described herein as separate parts, the cage and sleeve are preferably permanently attached to the cap by sonic welding or other suitable means to form an integral filter. Combining the parts into an integral unit has several advantages. For example, an integral unit ensures that the parts are assembled properly. It also eases handling during installation and maintenance.

Figure 16:
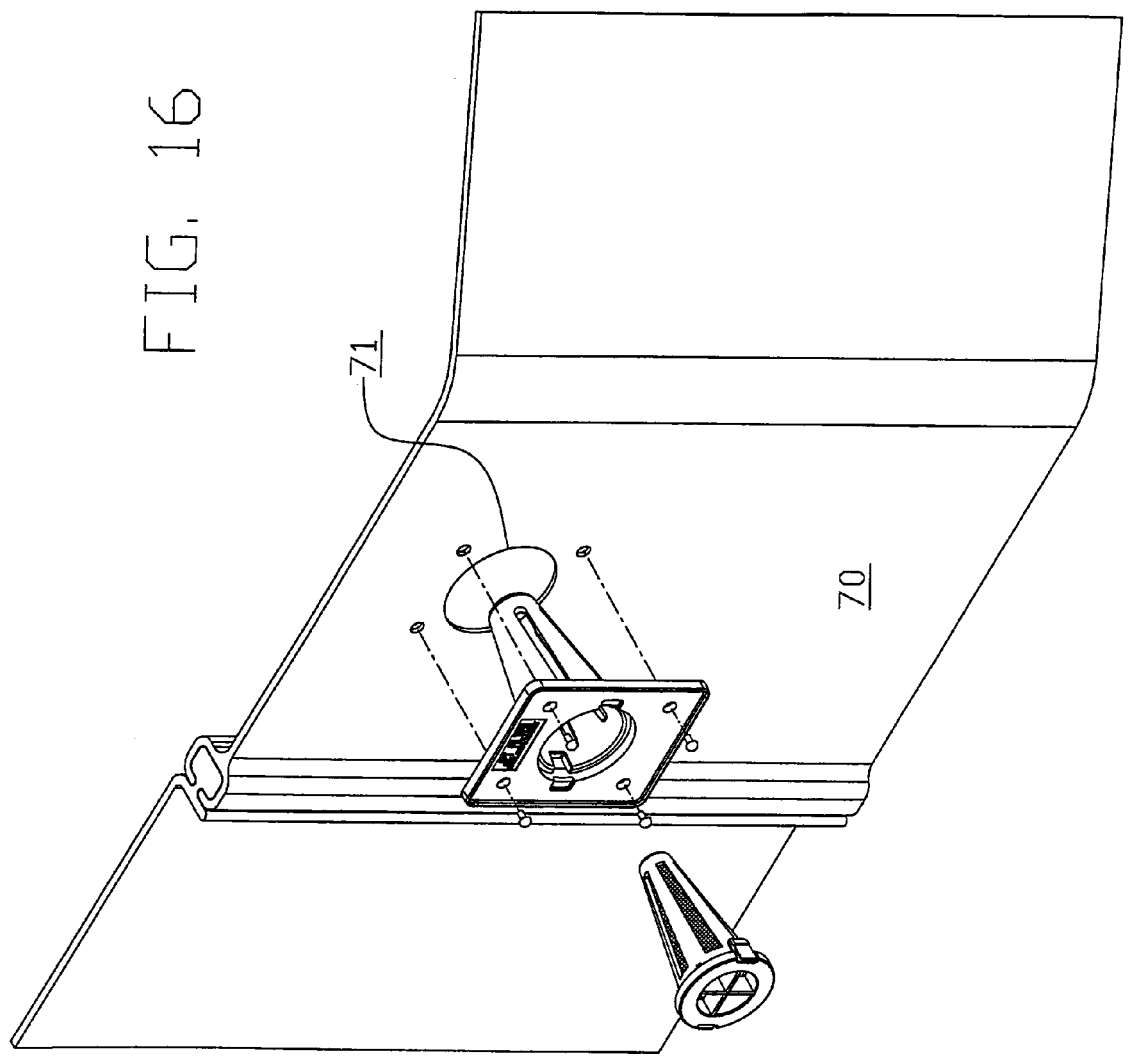
FIG. 16 is a perspective view of the assembly showing its installation into a seawall.

The installation and use of the filter assembly can now be considered. Installation of the preferred embodiment of the assembly into a seawall panel 70 is illustrated in FIG. 16. A hole 71 having a diameter of two and one-half inches is created in the seawall at a point above the water on the seaward side and below the planned or existing level of the ground on the landward side. If ground is present at the level of the hole, a conical or cylindrical plug of it must be removed behind the hole so that the housing can be inserted without obstruction. Preferably, a flowable backfill material such as #57 rock is used on the landward side of the seawall. The housing is then attached to the seawall with the four fasteners shown. The cage, filter element, sleeve, and cap are then assembled (if not already an integral unit) and placed into the housing. Filter assemblies are preferably installed in a seawall panel at spaced intervals of about two to ten feet, preferably about four to six feet. In bodies of water affected by tides, the filter assemblies are preferably installed at the mean high tide mark.

The flush surface of the filter assembly against the seaward side of the seawall provides two important advantages. First, the filter assembly is less likely to damage boats that may come into contact with the wall. Second, the filter assembly is not damaged itself by boats or people.

In most applications, the filter element functions well without any service for many years. When the filter element needs to be cleaned or replaced, the operation is performed quickly and easily without the use of any tools. If improved filter elements are developed in the future, they can be easily inserted into existing assemblies.

I claim:

1. A filter assembly for a seawall having a seaward side, a landward side, and a hole communicating between the sides for allowing groundwater to flow from the landward side to the seaward side, the filter assembly comprising:
    (a) a housing comprising a flat flange and a perforated conical shell, the shell having a base and an apex, the shell adapted to extend into the hole with its apex extending toward the landward side, the flange having a seaward side adapted to fit flushly against the seawall, the flange having a landward side connected to the shell, the flange having an opening that defines an open base for the shell;
    (b) a perforated conical cage having an open base that fits within the shell of the housing;
    (c) a conical filter element having an open base that fits within the cage;
    (d) a perforated conical sleeve having an open base that fits within the filter element; and
    (e) a perforated cap that is removably and flushly fastened to the opening in the flange to secure the cage, filter element, and sleeve within the shell of the housing.

2. The filter assembly of claim 1 wherein the perforations in the shell, cage, and sleeve comprise longitudinal slits.

3. The filter assembly of claim 2 wherein the filter element has a surface area at least twice that of the opening in the flange.

4. The filter assembly of claim 3 wherein the cap contains resilient spring clips.

5. The filter assembly of claim 4 wherein the cap is permanently attached to the sleeve.

6. A filter assembly for allowing groundwater to flow through a seawall from its landward side to its seaward side, the filter assembly comprising:
    (a) a housing comprising a flanged, elongated, perforated shell having an open base;
    (b) a perforated cage having an open base that fits within the housing;
    (c) a filter element having an open base that fits within the cage;
    (d) a perforated sleeve having an open base that fits within the filter element; and
    (e) a perforated cap that is removably fastened to the housing to secure the cage, filter element, and sleeve within the housing.

7. The filter assembly of claim 6 wherein housing shell tapers inwardly from its open base.

8. The filter assembly of claim 7 wherein the filter element has a surface area at least twice that of the opening of the base of the housing.

9. The filter assembly of claim 8 wherein the flange has a perimeter with a lip.

10. The filter assembly of claim 9 wherein the cap is permanently attached to the sleeve.

* * * * *